US012791413B2

(12) United States Patent
Suresh et al.

(10) Patent No.: US 12,791,413 B2
(45) Date of Patent: Nov. 10, 2026

(54) FLUID COUPLING MEDIUM FOR USE IN A MEDIA-ISOLATED PRESSURE SENSOR

(71) Applicant: HONEYWELL INTERNATIONAL INC., Charlotte, NC (US)

(72) Inventors: Somraj Suresh, Charlotte, NC (US); Manjesh Kumar B, Charlotte, NC (US); Ian Bentley, Charlotte, NC (US); Josh M. Fribley, Charlotte, NC (US); Kelong Yan, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 249 days.

(21) Appl. No.: 18/775,658

(22) Filed: Jul. 17, 2024

(65) Prior Publication Data

US 2025/0044174 A1 Feb. 6, 2025

(30) Foreign Application Priority Data

Aug. 1, 2023 (CN) ......................... 202310966280.0

(51) Int. Cl.
*G01L 19/06* (2006.01)

(52) U.S. Cl.
CPC ................................ *G01L 19/0645* (2013.01)

(58) Field of Classification Search
CPC .................................................. G01L 19/0645
(Continued)

(56) References Cited

U.S. PATENT DOCUMENTS 4,842,685 A 6/1989 Adams
5,741,975 A * 4/1998 Vaughn, II .......... G01L 19/0038
73/706

(Continued)

FOREIGN PATENT DOCUMENTS

EP 0400074 B1 9/1994
EP 3392634 B1 3/2021

OTHER PUBLICATIONS

Decision to grant a European patent Mailed on Mar. 19, 2026 for EP Application No. 24184884, 2 page(s).

(Continued)

*Primary Examiner* — Peter J Macchiarolo
*Assistant Examiner* — Rodney T Frank
(74) *Attorney, Agent, or Firm* — Alston & Bird LLP

(57) ABSTRACT

An example coupling mechanism for a media-isolated pressure sensor, method for manufacturing the coupling mechanism, and media-isolated pressure sensor are provided. The coupling mechanism includes a fluid coupling medium disposed in an interior cavity of a pressure sensor housing, forming a barrier between pressure sensing circuitry and a fluid. Disposing the fluid coupling medium includes dispensing within the interior cavity, a first portion of a fluid coupling substance having a volume less than a maximum substance volume, and removing dissolved gas from within the first portion. Disposing the fluid coupling medium further includes dispensing a second portion of the fluid coupling substance within the interior cavity, the second portion also having a volume less than the maximum substance volume. The fluid coupling substance is cured, forming a coupling mechanism, such that pressure sensing circuitry generates electrical signals based on pressure imposed by the fluid through the coupling mechanism.

20 Claims, 5 Drawing Sheets

(58) Field of Classification Search
USPC .......................................................... 73/706
See application file for complete search history.

(56) References Cited

U.S. PATENT DOCUMENTS

| | | | | |
|---|---|---|---|---|
| 12,181,328 | B2 * | 12/2024 | Mudd | G01F 7/005 |
| 2007/0245830 | A1 * | 10/2007 | Thuruthumaly | G01L 19/003<br>73/756 |
| 2017/0176278 | A1 * | 6/2017 | Chen | G01L 19/146 |
| 2023/0400373 | A1 * | 12/2023 | Wade | G01L 19/0007 |

OTHER PUBLICATIONS

Extended European Search Report Mailed on Dec. 6, 2024 for EP Application No. 24184884, 9 page(s).
Intention to grant Mailed on Nov. 14, 2025 for EP Application No. 24184884, 6 page(s).

* cited by examiner

FLUID COUPLING MEDIUM FOR USE IN A MEDIA-ISOLATED PRESSURE SENSOR

CROSS-REFERENCE TO RELATED APPLICATIONS

This application claims priority pursuant to 35 U.S.C. 119(a) to Chinese Application No. 202310966280.0, filed Aug. 1, 2023, which application is incorporated herein by reference in its entirety.

TECHNOLOGICAL FIELD

Embodiments of the present disclosure relate generally to media-isolated pressure sensors, and more particularly, to manufacturing the fluid coupling medium used in a media-isolated pressure sensor.

BACKGROUND

Applicant has identified many technical challenges and difficulties associated with the manufacture and performance of a media-isolated pressure sensor. Through applied effort, ingenuity, and innovation, Applicant has solved problems related to a fluid coupling medium used in a media-isolated pressure sensor by developing solutions embodied in the present disclosure, which are described in detail below.

BRIEF SUMMARY

Various embodiments are directed to an example method and an example coupling mechanism and media-isolated pressure sensor utilizing the example method for manufacturing a fluid coupling medium.

An example coupling mechanism for a media-isolated pressure sensor is provided. In some embodiments, the example coupling mechanism comprises a fluid coupling medium disposed in an interior cavity of a pressure sensor housing, forming a barrier between pressure sensing circuitry and a fluid media. The pressure sensing circuitry may be configured to generate an electrical signal based on a fluid media pressure imposed by the fluid media through the coupling mechanism. In addition, disposing the fluid coupling medium in the interior cavity of the pressure sensor housing comprises dispensing, within the interior cavity, a first portion of a fluid coupling substance, wherein a first portion volume of the first portion of the fluid coupling substance is less than a maximum fluid coupling substance volume. Disposing the fluid coupling medium in the interior cavity of the pressure sensor housing further comprises removing dissolved gas from within the first portion of the fluid coupling substance; dispensing, within the interior cavity, adjacent to the first portion of the fluid coupling substance, a second portion of the fluid coupling substance, wherein a second portion volume of the second portion of the fluid coupling substance is less than the maximum fluid coupling substance volume, and wherein the interior cavity formed by the pressure sensor housing is substantially filled; removing dissolved gas from within the second portion of the fluid coupling substance; and curing the first portion and the second portion of the fluid coupling substance.

In some embodiments, the coupling mechanism further comprises a protective coating disposed on a top surface of the fluid coupling medium, wherein the protective coating forms a second barrier between the fluid coupling medium and fluid media.

In some embodiments, the protective coating comprises an epoxy.

In some embodiments, removing dissolved gas from the fluid coupling substance comprises exposing the fluid coupling substance to a vacuum environment.

In some embodiments, curing the first portion of the fluid coupling substance occurs before the second portion of the fluid coupling substance is dispensed within the interior cavity.

In some embodiments, the maximum fluid coupling substance volume is determined based on a cavity ratio of a cavity diameter of the interior cavity and a cavity height of the interior cavity.

In some embodiments, a maximum cavity ratio defining the maximum fluid coupling substance volume is between 0.39 and 0.41.

An example method for manufacturing a coupling mechanism in a media-isolated pressure sensor is further provided. In some embodiments, the method comprises dispensing, in an interior cavity formed by a pressure sensor housing, a first portion of a fluid coupling substance, wherein the fluid coupling substance forms a barrier between pressure sensing circuitry and a fluid media, wherein the pressure sensing circuitry is configured to generate an electrical signal based on a fluid media pressure imposed by a fluid media through the fluid coupling medium, and wherein a first portion volume of the first portion of the fluid coupling substance is less than a maximum fluid coupling substance volume. The method may further comprise removing dissolved gas from within the first portion of the fluid coupling substance; and dispensing, within the pressure sensor housing of the media-isolated pressure sensor, adjacent to the first portion of the fluid coupling substance, a second portion of the fluid coupling substance, wherein a second portion volume of the second portion of the fluid coupling substance is less than the maximum fluid coupling substance volume, and wherein the interior cavity formed by the pressure sensor housing is substantially filled. The method may further comprise removing dissolved gas from within the second portion of the fluid coupling substance; and curing the first portion and the second portion of the fluid coupling substance.

In some embodiments, the method further comprises disposing a protective coating on a top surface of the fluid coupling medium, wherein the protective coating forms a second barrier between the fluid coupling medium and the fluid media.

In some embodiments, the protective coating comprises an epoxy.

In some embodiments, in an instance in which the second portion of the fluid coupling substance does not substantially fill the interior cavity formed by the pressure sensor housing, the method further comprises: dispensing in an interior cavity of a pressure sensor housing, one or more additional portions of the fluid coupling substance, wherein each of the one or more additional portions of the fluid coupling substance have an additional portion volume less than a maximum fluid coupling substance volume. In some embodiments, the method may further comprise removing dissolved gas from within each of the one or more additional portions of the fluid coupling substance, wherein dispensing additional portions of the fluid coupling substance and removing dissolved gas are repeated until the interior cavity is substantially full.

In some embodiments, removing dissolved gas from the fluid coupling substance comprises exposing the fluid coupling substance to a vacuum environment.

In some embodiments, curing a portion of the fluid coupling substance occurs before a subsequent portion of the fluid coupling substance is dispensed within the interior cavity.

In some embodiments, the maximum fluid coupling substance volume is determined based on a cavity ratio of a cavity diameter of the interior cavity and a cavity height of the interior cavity.

In some embodiments, a maximum cavity ratio defining the maximum fluid coupling substance volume is between 0.39 and 0.41.

An example media-isolated pressure sensor is further provided. In some embodiments, the example media-isolated pressure sensor comprises a pressure sensor housing configured to form an interior cavity; pressure sensing circuitry disposed within the interior cavity of the pressure sensor housing; and a coupling mechanism comprising a fluid coupling medium disposed in the interior cavity of the pressure sensor housing. In some embodiments, disposing the fluid coupling medium in the interior cavity of the pressure sensor housing comprises dispensing, within the interior cavity, a first portion of a fluid coupling substance, wherein a first portion volume of the first portion of the fluid coupling substance is less than a maximum fluid coupling substance volume. Disposing the fluid coupling medium in the interior cavity of the pressure sensor housing may further comprise removing dissolved gas from within the first portion of the fluid coupling substance; dispensing, within the interior cavity, adjacent to the first portion of the fluid coupling substance, a second portion of the fluid coupling substance, wherein a second portion volume of the second portion of the fluid coupling substance is less than the maximum fluid coupling substance volume, and wherein the interior cavity formed by the pressure sensor housing is substantially filled; removing dissolved gas from within the second portion of the fluid coupling substance; and curing the first portion and the second portion of the fluid coupling substance, wherein the fluid coupling medium forms a barrier between the pressure sensing circuitry and a fluid media, and wherein the pressure sensing circuitry is configured to generate an electrical signal based on a fluid media pressure imposed on the pressure sensing circuitry through the fluid coupling mechanism.

In some embodiments, the media-isolated pressure sensor may further comprise a protective coating disposed on a top surface of the fluid coupling medium, wherein the protective coating forms a second barrier between the fluid coupling medium and fluid media.

In some embodiments, the protective coating comprises an epoxy.

In some embodiments, removing dissolved gas from the fluid coupling substance comprises exposing the fluid coupling substance to a vacuum environment.

In some embodiments, curing the first portion of the fluid coupling substance occurs before the second portion of the fluid coupling substance is dispensed within the interior cavity.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
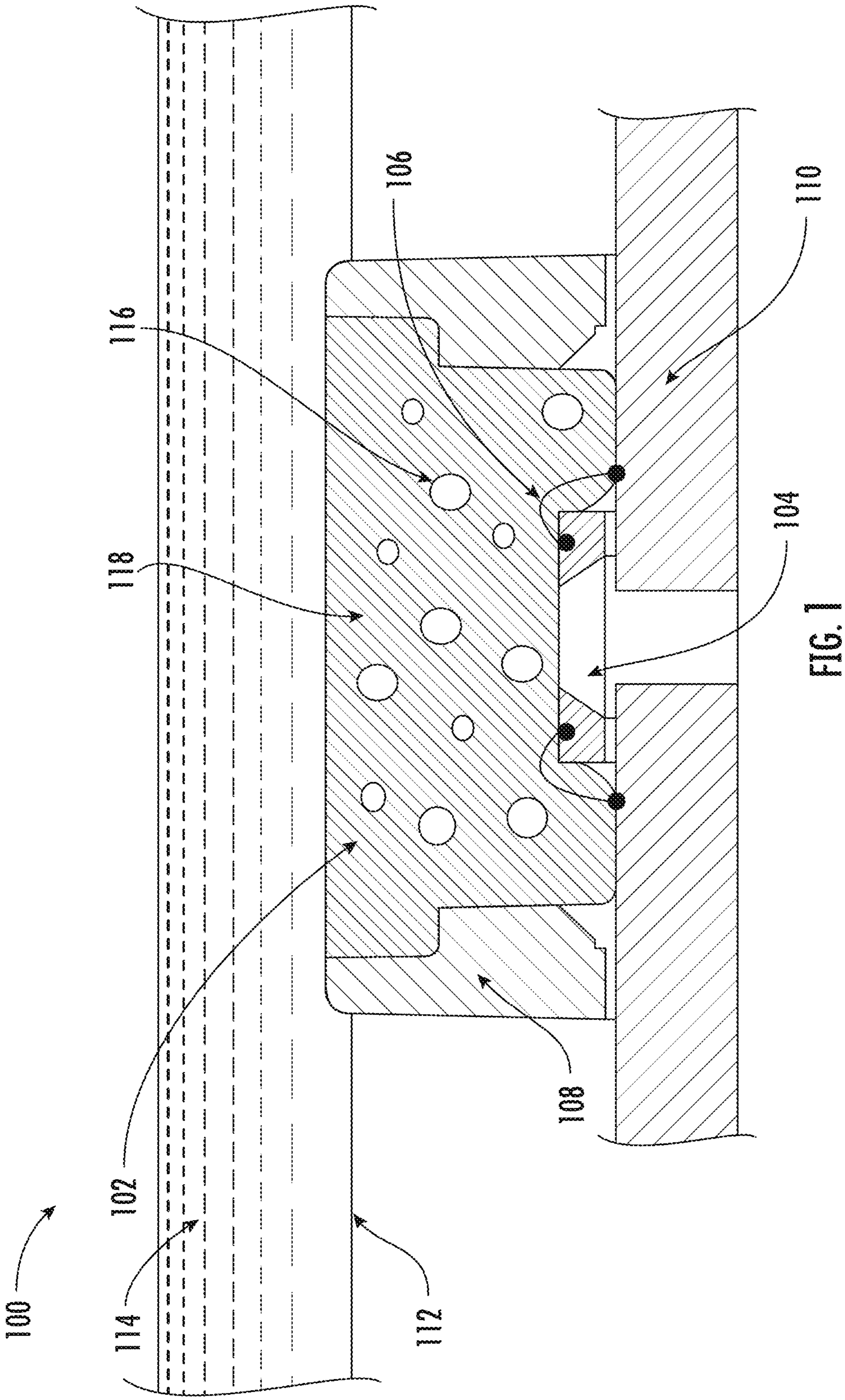
FIG. 1 illustrates a cross-section of an example media-isolated sensor having a fluid coupling medium with trapped dissolved gas.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with coupling an external pressure or force from a fluid media (e.g., liquid or gas) with the pressure sensing circuitry in a media-isolated pressure sensor. As understood by those of skill in the field to which the present disclosure pertains, there are numerous scenarios in which a high precision pressure and/or force may be measured while maintaining isolation between the pressure sensing circuitry and the fluid media exhibiting a pressure.

In general, a pressure sensor is a transducer device designed to produce an electrical signal based on a pressure imposed on the pressure sensing circuitry. In many applications, a flush mount pressure sensor is used to measure the pressure of a fluid media. A flush mount pressure sensor is designed to be mounted in a tube or other conduit carrying the fluid media. A media-isolated pressure sensor may be necessary to create a barrier between the measured fluid media and the pressure sensing circuitry of the media-isolated pressure sensor.

For example, medical staff may desire to measure the blood pressure of a patient through an intravenous line. In such a scenario, a portion of the media-isolated pressure sensor may be inserted directly into an intravenous line or other conduit carrying the blood of the patient. To comply with medical standards, it may be important that the pressure sensing circuitry remain isolated from the bodily fluid of the patient and from the incoming intravenous fluid. Further, isolation from the pressure sensing circuitry may be necessary to prevent short circuits and otherwise ensure the proper operation of the pressure sensor.

In addition, certain fluid media may be damaging to the pressure sensing circuitry and other components of a pressure sensor. Such fluid media may include blood, saline water, coffee, gasoline, engine oils, and other similar fluids. In some embodiments, such fluid media may be isolated from the pressure sensing circuitry and other components of the pressure sensor to protect the internal components of the pressure sensor from exposure to the fluid media. A pressure sensor employing a mechanism to separate the pressure sensing circuitry from the measured fluid media is referred to herein as a media-isolated pressure sensor.

In order to isolate the fluid media from the electrical components of the media-isolated pressure sensor while still enabling the receipt of exerted pressure from the fluid media, a coupling mechanism comprising a fluid coupling substance, such as a protective gel, is dispensed into an interior cavity of a pressure sensor housing. The fluid coupling substance encapsulates the pressure sensing circuitry, protecting the circuitry during measurement of the fluid media. The fluid coupling substance ensures no fluid contacts the pressure sensing circuitry of the media-isolated pressure sensor, protecting the pressure sensing circuitry from damaging fluid media and complying with medical standards.

Further, the fluid coupling substance acts as a fluid coupling medium, transferring the pressure force exhibited by the fluid media to the pressure sensing components (e.g. pressure sensing diaphragm) of the pressure sensing circuitry. Thus, the fluid coupling medium (comprising a fluid coupling substance) enables the pressure sensing circuitry to measure the pressure of the fluid media.

Various methods for filling the interior cavity of the pressure sensor housing result in pockets of dissolved gases (e.g., bubbles) in the fluid coupling substance. Dissolved gases in a fluid coupling medium adversely affect the performance of the media-isolated pressure sensor, resulting in inaccurate and inconsistent pressure measurements. The adverse effect of the dissolved gases is exacerbated in an instance in which the media-isolated pressure sensor is exposed to high temperatures, for example, in an instance in which the media-isolated pressure sensor is soldered onto a supporting circuit board. In such an instance, the dissolved gases expand, increasing the size of the entrapped air bubbles. Vacuuming methods are often employed to force the dissolved gases out of the fluid coupling substance during manufacturing, however, these methods become largely ineffective for larger volumes of fluid coupling substances. In addition, many media-isolated pressure sensors are used in high pressure environments with abrasive fluid media. In such instances, over time the fluid media may damage and erode the fluid coupling medium, further reducing the accuracy and consistency of the media-isolated pressure sensor.

The various example embodiments described herein utilize various techniques to form a coupling mechanism in a media-isolated pressure sensor. For example, in some embodiments, a multi-step process is utilized to dispose the fluid coupling substance in the interior cavity of the pressure sensor housing. The first step includes injecting a portion of the fluid coupling substance not to exceed a maximum fluid coupling substance volume. The injected fluid coupling substance may then be exposed to a vacuum environment, evacuating any dissolved gas in the first portion of the fluid coupling substance. In addition, the first portion of the fluid coupling substance may be optionally cured once the dissolved gas is evacuated.

A subsequent step may include injecting a second portion of the fluid coupling substance not to exceed the maximum fluid coupling substance volume. The second portion of the injected fluid coupling substance may then be exposed to a vacuum environment, evacuating any dissolved gas in the second portion of the fluid coupling substance. The process may continue until the interior cavity of the pressure sensor housing is substantially full and capable of producing accurate pressure sensing measurements.

In addition, in some embodiments disclosed herein, a protective coating may be dispensed on the top surface of the fluid coupling medium. The protective coating may be cured such that the protective coating exhibits an increased hardness compared to the fluid coupling medium. The protective coating thus provides robust protection against a harsh fluid media application. While the top layer exhibits an increased hardness, the internal fluid coupling medium remains comparatively soft, providing the transmission properties necessary for accurate determination of a pressure in the fluid media.

As a result of the herein described example embodiments and in some examples, the accuracy and effectiveness of a media-isolated pressure sensor may be greatly improved. In addition, the resiliency and continued accuracy of the media-isolated pressure sensor over time may be maintained.

Referring now to FIG. 1, an example media-isolated pressure sensor 100 is provided. As depicted in FIG. 1, the example media-isolated pressure sensor 100 includes a pressure sensor housing 108 extending from a substrate 110 to create an interior cavity 118. The example media-isolated pressure sensor 100 further includes pressure sensing circuitry 104 attached to the substrate 110, opposite the open end of the interior cavity 118. The interior cavity 118 is filled with a fluid coupling medium 102. As shown in FIG. 1, the fluid coupling medium 102 includes dissolved gas 116 forming a plurality of air pockets or bubbles in the fluid coupling medium 102. As further depicted in FIG. 1, the pressure sensor housing 108 is inserted into a fluid conduit 112 carrying a fluid media 114. The pressure of the fluid media 114 is transmitted through the fluid coupling medium 102 and received by the pressure sensing circuitry 104.

As depicted in FIG. 1, the example media-isolated pressure sensor 100 includes a pressure sensor housing 108 attached to a substrate 110 to form an interior cavity 118. The substrate 110 is any structure configured to support the attachment of the pressure sensing circuitry 104 components and pressure sensor housing 108. In some embodiments, the substrate 110 may comprise a printed circuit board (PCB) or ceramic alumina including electrical connections connecting the pressure sensing circuitry to a processor, controller, analog-to-digital converter, or other electrical components.

As further depicted in FIG. 1, the example media-isolated pressure sensor 100 includes a pressure sensor housing 108. A pressure sensor housing 108 may be any structure, wall, or plurality of walls configured to form, with the substrate 110 a partially enclosed interior cavity 118. The pressure sensor housing 108 is configured to enclose the pressure sensing circuitry 104 within the interior cavity 118 of the pressure sensor housing 108. As shown in FIG. 1, the pressure sensor housing 108 may have a circular tubular shape (characterized by a diameter and a height), although other configurations may be suitable for certain implementations. For example, the pressure sensor housing 108 may have a rectangular cross-section (having four sidewalls), a triangular cross-section (having three sidewalls), a hexagonal cross-section (having six sidewalls), and/or the like.

In some embodiments, the pressure sensor housing 108 may further comprise a sealing structure surrounding an outer surface of the one or more sidewalls of the pressure sensor housing 108 for creating a seal between the media-isolated pressure sensor 100 and a fluid conduit 112. A sealing structure (e.g., port) may secure the media-isolated pressure sensor 100 within the fluid conduit 112 and ensure no leakage of the fluid media 114 at the interface of the fluid conduit 112 with the media-isolated pressure sensor 100.

As further depicted in FIG. 1, the example media-isolated pressure sensor 100 includes pressure sensing circuitry 104 attached to the substrate 110 in the interior cavity 118, opposite the open end of the interior cavity 118. The pressure sensing circuitry 104 is any circuitry configured to produce an electrical signal based on a pressure exerted on a sensing surface of the pressure sensing circuitry 104. In some embodiments, the pressure sensing circuitry 104 may include a pressure sensing diaphragm. A pressure sensing diaphragm may be formed of a semiconductor material configured to deform under an applied pressure to the surface of the pressure sensing diaphragm. In some embodiments, the pressure sensing diaphragm may contain piezoresistive sensors arranged in a Wheatstone bridge circuit, such that pressure on and deflection of the pressure sensing diaphragm creates a change in resistance in the disposed sensors and a voltage output correlated to the applied force. In some embodiments, the pressure sensing diaphragm may be placed over an opening allowing the pressure sensing diaphragm to deflect in a manner, such that the change in the electrical properties of the pressure sensing diaphragm are representative of the applied pressure.

In addition to a pressure sensing diaphragm, the pressure sensing circuitry 104 may include a pressure sensing die. A pressure sensing die may comprise electrical components configured to electrically connect to the pressure sensing diaphragm and monitor changes in the resistivity of the pressure sensing diaphragm based on the pressure applied to the surface of the pressure sensing diaphragm by a fluid coupling medium 102. A pressure sensing die may include converters, hardware components, a processor, or other electronic components configured to aid in the conversion of the pressure applied to the pressure sensing diaphragm to an electrical signal. The electrical signal representing the pressure applied to the pressure sensing diaphragm may be transmitted by one or more wire bonds 106 to one or more conductive components on the substrate 110.

In some embodiments, the pressure sensing circuitry may electrically connect to the substrate 110 via through-hold connectors passing through the substrate 110, such that output signals resulting from applied pressure to the pressure sensing circuitry 104 are transmitted from the pressure sensing circuitry 104, through the substrate 110 to conductive elements on the opposite side of the substrate 110. By passing electrical connections through the through-hole connectors of a substrate 110 and making the electrical connections outside of the interior cavity 118, the electrical connections and soldered components of the pressure sensing circuitry 104 may be protected from damage or shorts due to the pressure applied to the fluid coupling medium 102.

As further depicted in FIG. 1, the example media-isolated pressure sensor 100 includes a fluid coupling medium 102 substantially filling the interior cavity 118 to provide coupling mechanism between the pressure sensing circuitry 104 and the fluid media 114 in the fluid conduit 112. The fluid coupling medium may comprise any incompressible fluid coupling substance configured to provide a fluid coupling between the fluid media 114 and the pressure sensing circuitry 104. In some embodiments, the fluid coupling medium may comprise a gel fluid coupling substance such as silicone gel. As depicted in FIG. 1, the fluid coupling medium 102 deforms to substantially cover the surface of the pressure sensing circuitry 104. In addition, the fluid coupling medium 102 substantially fills the interior cavity 118 of the pressure sensor housing 108, such that the fluid coupling medium 102 is substantially flush with the top of the pressure sensor housing. By substantially filling the pressure sensor housing 108 with the fluid coupling medium 102, pressure exerted by the fluid media 114 in the fluid conduit 112 may be more precisely transmitted to the pressure sensing circuitry 104.

As further depicted in FIG. 1, the media-isolated pressure sensor 100 is attached to a fluid conduit 112 holding a fluid media 114 such that the fluid coupling medium 102 is in contact with the fluid media 114. A fluid conduit 112 may be any tube, duct, pipe, or other conduit configured to enable the flow of fluid media 114 within the fluid conduit 112. In some embodiments, a fluid conduit 112 may comprise an intravenous line carrying the blood or other bodily fluid of a patient, a catheter, a gas line enabling the flow of gasoline, or any other fluid line configured to enable the flow of a fluid or gas.

A fluid media 114 may be any liquid or gas contained within a fluid conduit 112. In some embodiments, a fluid media 114 may comprise blood, bodily fluids, saline water, coffee, gasoline, engine oils, oxygen, methane, carbon dioxide, and other similar fluids. A fluid media 114 may exhibit a pressure within the fluid conduit 112. A pressure may be exhibited based on the operation of an organ of the body (e.g., heart pumping), mechanical machinery (e.g., gas pump), an influx of additional fluid media 114, or from any other source. As depicted in FIG. 1, the fluid coupling medium 102 of the media-isolated pressure sensor 100 is positioned within the fluid conduit 112 such that the fluid media 114 is in contact with the fluid coupling medium 102. As such, the pressure of the fluid media 114 is exerted against the fluid coupling medium 102. The fluid coupling medium 102 is fluidly coupled with the pressure sensing circuitry 104, thus, the pressure of the fluid media 114 is transmitted through the fluid coupling medium 102 to the pressure sensing circuitry 104.

In addition, the fluid coupling medium 102 forms a barrier between the pressure sensing circuitry 104 and the fluid media 114. In an instance in which the fluid media 114 comes in contact with the pressure sensing circuitry 104 the fluid media 114 may damage the electrical components of the pressure sensing circuitry 104. In addition, contact with the pressure sensing circuitry 104 may cause short circuits or other catastrophic failures. Thus, the fluid coupling medium 102 is utilized to create a barrier through which the fluid media 114 cannot penetrate. Instead, the pressure of the fluid media 114 is transmitted by fluid coupling through the fluid coupling medium 102 to the pressure sensing circuitry 104.

As further depicted in FIG. 1, the fluid coupling medium 102 may comprise dissolved gas 116. In some approaches, the fluid coupling substance (e.g., silicone gel) comprising the fluid coupling medium 102 may be mixed and deposited in the interior cavity 118 of the pressure sensor housing 108. Using such approaches may result in the capture of dissolved gas 116 within the fluid coupling substance. Dissolved gas 116 within the fluid coupling substance may adversely effect the operation of the media-isolated pressure sensor 100. For example, dissolved gas 116 within the fluid coupling medium 102 may result in inconsistent pressure measurements based on the pressure applied by the fluid media 114 on the surface of the fluid coupling medium 102. The adverse effects may be exacerbated in the presence of heat, for example, in an instance in which a media-isolated pressure sensor 100 is soldered to an underlying circuit board. In the presence of heat, the dissolved gas 116 within the fluid coupling medium 102 may expand to form dissolved gas 116 air pockets of increased size. The presence of air pockets of dissolved gas 116 or bubbles in the fluid coupling medium 102 may have a significant impact on the accuracy and consistency of the media-isolated pressure sensor 100. The embodiments described as part of the present disclosure substantially reduce the dissolved gas 116 and resulting bubbles present in the fluid coupling medium 102.

Figure 2:
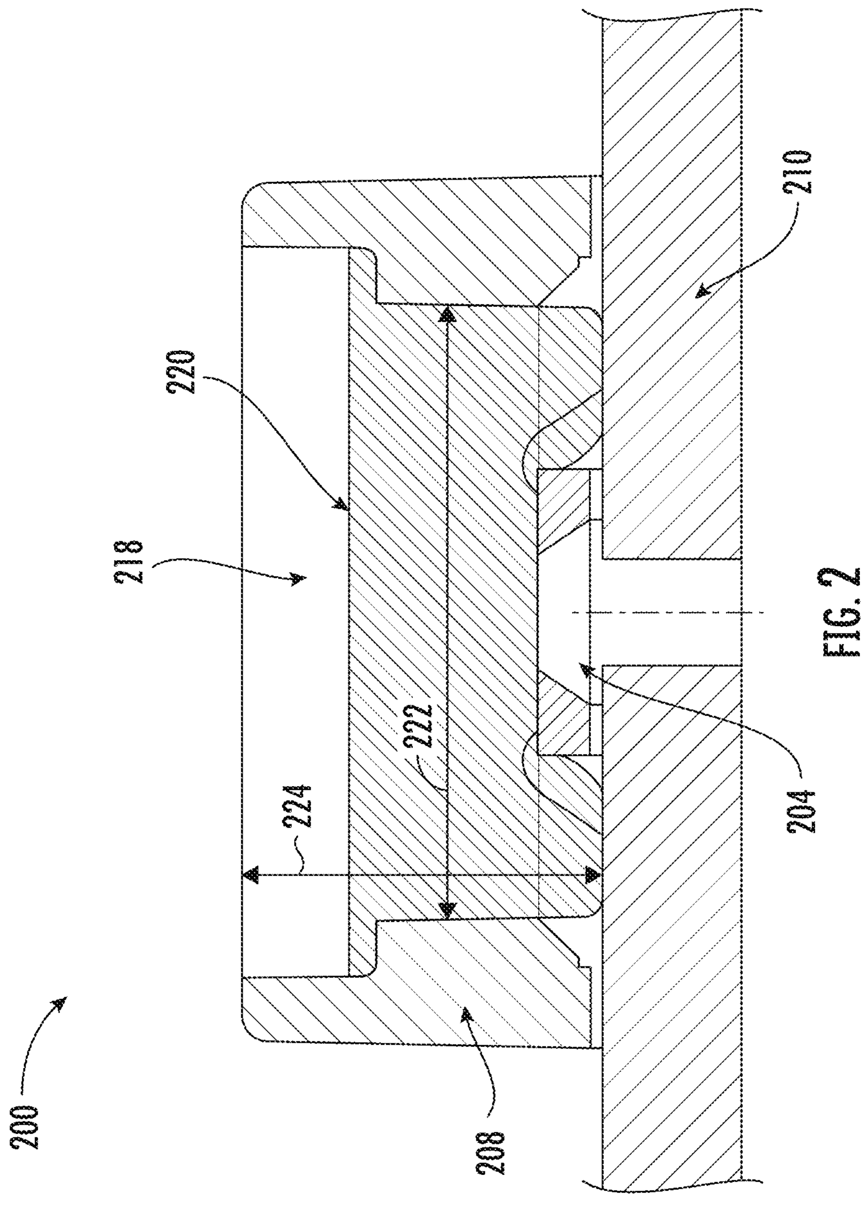
FIG. 2 illustrates a cross-section of an example media-isolated pressure sensor with a first portion of the fluid coupling substance in accordance with an example embodiment of the present disclosure.

Referring now to FIG. 2, an example media-isolated pressure sensor 200 is depicted. The example media-isolated pressure sensor 200 includes a pressure sensor housing 208 comprising a wall extending from a substrate 210 and forming an enclosed perimeter around an interior cavity 218. The interior cavity 218 is enclosed by the substrate 210 at one-end, by the pressure sensor housing 208 at the sides, and open at an end opposite the substrate 210. As further depicted in FIG. 2, the interior cavity 218 has a cavity diameter 222 and a cavity height 224. Pressure sensing circuitry 204 is shown attached to the substrate 210 within the interior cavity 218. In addition, a first portion of a fluid coupling substance 220 is shown, partially filling the interior cavity 218 of the media-isolated pressure sensor 200.

As depicted in FIG. 2, a first portion of a fluid coupling substance 220 is dispensed in the interior cavity 218 created by the pressure sensor housing 208. As described in relation to FIG. 1, the first portion of the fluid coupling substance 220 may comprise any incompressible fluid configured to provide a fluid coupling between a fluid media and the pressure sensing circuitry 204. For example, the first portion of the fluid coupling substance 220 may comprise a gel fluid coupling substance such as silicone gel.

During the mixing and dispensing process, dissolved gases (e.g., dissolved gas 116) may be captured in the fluid coupling substance. The dissolved gas may expand into bubbles, adversely affecting the performance of the media-isolated pressure sensor 200. Thus, a media-isolated pressure sensor with a fluid coupling substance may be exposed to a vacuum environment to remove entrapped dissolved gas within the fluid coupling substance. However, at larger volumes of the fluid coupling substance, vacuuming techniques become less effective in removing dissolved gases.

To prevent the formation of pockets of dissolved gas, a maximum fluid coupling substance volume is determined to limit the amount of fluid coupling substance dispensed into the interior cavity 218 before vacuuming the dispensed fluid coupling substance. The maximum fluid coupling substance volume may be determined based on a variety of factors, including but not limited to the makeup of the fluid coupling substance, the dimensions of the interior cavity 218, the vacuuming techniques utilized, the curing procedures, and other factors. For example, in an instance in which silicone gel is used as the fluid coupling substance the maximum fluid coupling substance volume of silicone gel dispensed before vacuuming the dissolved gases may be based on the weight of the silicone gel. In some embodiments, the maximum fluid coupling substance volume for silicone gel may be between 28 and 42 milligrams; more preferably between 30 and 40 milligrams; most preferably between 34 and 36 milligrams.

In some embodiments, the maximum fluid coupling substance volume may be based on the physical dimensions of the interior cavity 218. As depicted in FIG. 2, the interior cavity 218 comprises a cavity diameter 222 and a cavity height 224. The effectiveness of removing the dissolved gas from a fluid coupling substance may be dependent on the physical dimensions of the interior cavity 218. For example, in some embodiments, an interior cavity 218 may have a wide cavity diameter 222 but a shallow cavity height 224. Although the amount of fluid coupling substance required to fill the interior cavity 218 may be substantial, vacuuming techniques for removing the dissolved gas for such dimensions of the interior cavity may be effective. As such, the maximum fluid coupling substance volume may be based on the cavity ratio, wherein the cavity ratio is determined based on the ratio of the cavity height 224 to the cavity diameter 222. In some embodiments, the maximum fluid coupling substance volume may be between 0.35 and 0.45; more preferably between 0.37 and 0.43; most preferably between 0.39 and 0.41. Although the pressure sensor housing 208 is depicted having a circular cross-section, the maximum fluid coupling substance volume may be similarly determined based on the cavity ratio for any cross-sectional shape of the pressure sensor housing 208.

Figure 3:
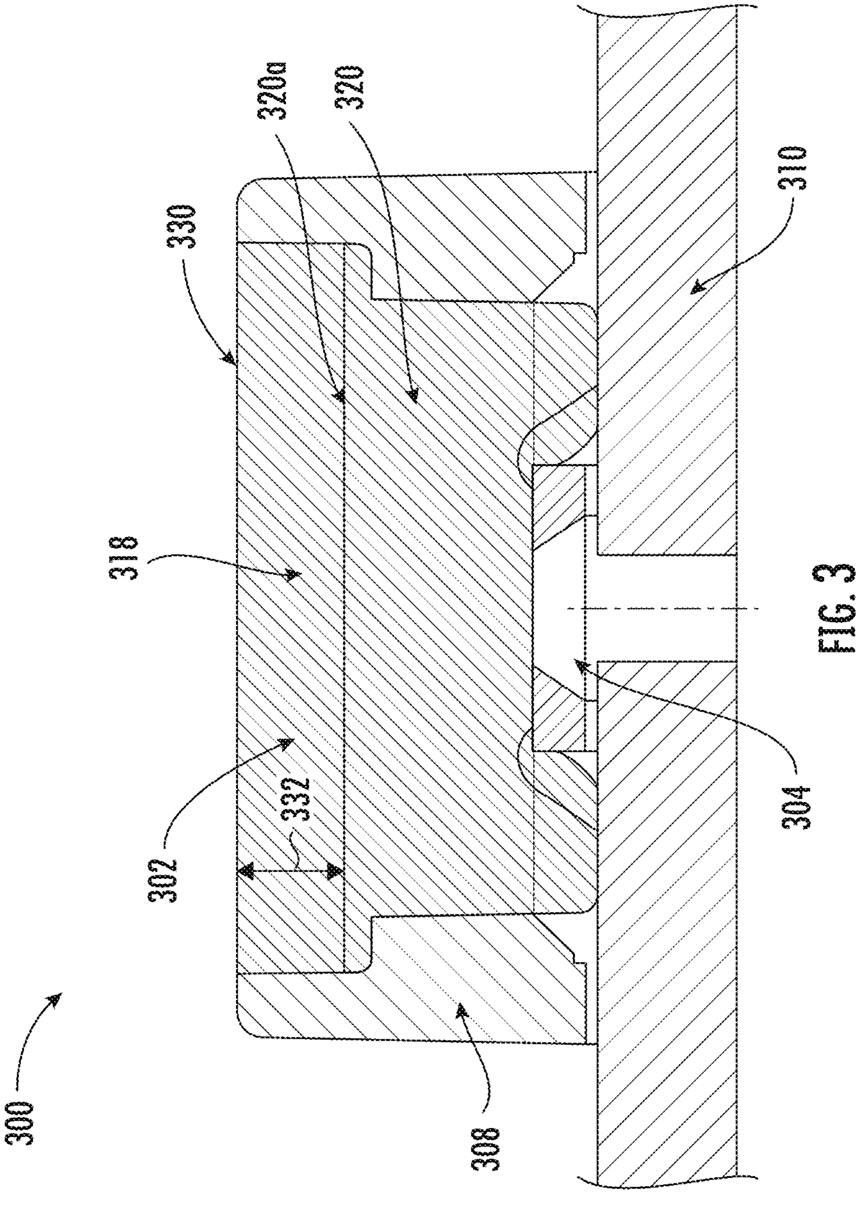
FIG. 3 illustrates a cross-section of an example media-isolated pressure sensor with a second portion of the fluid coupling substance in accordance with an example embodiment of the present disclosure.

Referring now to FIG. 3, an example media-isolated pressure sensor 300 is depicted. The example media-isolated pressure sensor 300 includes a pressure sensor housing 308 comprising a wall extending from a substrate 310 and forming an enclosed perimeter around an interior cavity 318. The interior cavity 318 is enclosed by the substrate 310 at one-end, by the pressure sensor housing 308 at the sides, and open at an end opposite the substrate 310. Pressure sensing circuitry 304 is shown attached to the substrate 310 within the interior cavity 318. As further depicted in FIG. 3, a second portion of a fluid coupling substance 330 is dispensed on top of the first portion of the fluid coupling substance 320, filling the interior cavity 318 of the media-isolated pressure sensor 300.

As depicted in FIG. 3, the example media-isolated pressure sensor 300 includes a second portion of the fluid coupling substance 330 dispensed on the top surface 320*a* of the first portion of the fluid coupling substance 320. As described in relation to FIG. 1, the second portion of the fluid coupling substance 330 may comprise any incompressible fluid configured to provide a fluid coupling between a fluid media and the pressure sensing circuitry 304. For example, the second portion of the fluid coupling substance 330 may comprise a gel fluid coupling substance such as silicone gel. In some embodiments, the second portion of the fluid coupling substance 330 may be the same substance as the first portion of the fluid coupling substance 320.

As depicted in FIG. 3, the second portion of the fluid coupling substance 330 may be dispensed until the second portion of the fluid coupling substance 330 is flush with the top of the sidewalls of the pressure sensor housing 308. As depicted in FIG. 3, the first portion of the fluid coupling substance 320 and the second portion of the fluid coupling substance 330 together form the fluid coupling medium 302. Any pressure applied by a fluid media to the second portion of the fluid coupling substance 330, is transmitted through the second portion of the fluid coupling substance 330 and adjacent first portion of the fluid coupling substance 320 to the pressure sensing circuitry 304.

In some instances, the volume of fluid coupling substance necessary to fill the remaining portion of the interior cavity 318 may exceed the maximum fluid coupling substance volume. In such an instance, the second portion of the fluid coupling substance 330 is limited to a volume below the maximum fluid coupling substance volume. Thus, the second portion of the fluid coupling substance 330 may be deposited and the dissolved gas removed previous to additional portions of the fluid coupling substance being added as necessary.

As described in relation to FIG. 2, the maximum fluid coupling substance volume may be determined based on the volume or mass of the fluid coupling substance. Thus, in an instance in which the mass or volume of fluid coupling substance necessary to fill the remaining portion of the interior cavity 318 exceeds the maximum fluid coupling substance volume, the fluid coupling substance may require one or more additional portions to be added to the interior cavity after the second portion of the fluid coupling substance 330.

As further described in relation to FIG. 2, the maximum fluid coupling substance volume may be determined based on the physical dimensions of the interior cavity 318 defined by the pressure sensor housing 308. Once the first portion of the fluid coupling substance 320 is dispensed in the interior cavity 318, a remaining cavity height 332 from the top surface 320*a* of the first portion of the fluid coupling substance 320 may be defined. The remaining cavity height 332 is the distance from the top surface 320*a* of the first portion of the fluid coupling substance 320 to the upper extent of the sidewall of the pressure sensor housing 308. The cavity ratio may be determined based on the remaining cavity height 332 and the cavity diameter (e.g., cavity diameter 222). In an instance in which the cavity ratio exceeds a maximum cavity ratio, as defined by the maximum fluid coupling substance volume one or more additional portions of fluid coupling substance may be added to the interior cavity after the second portion of the fluid coupling substance 330.

Figure 4:
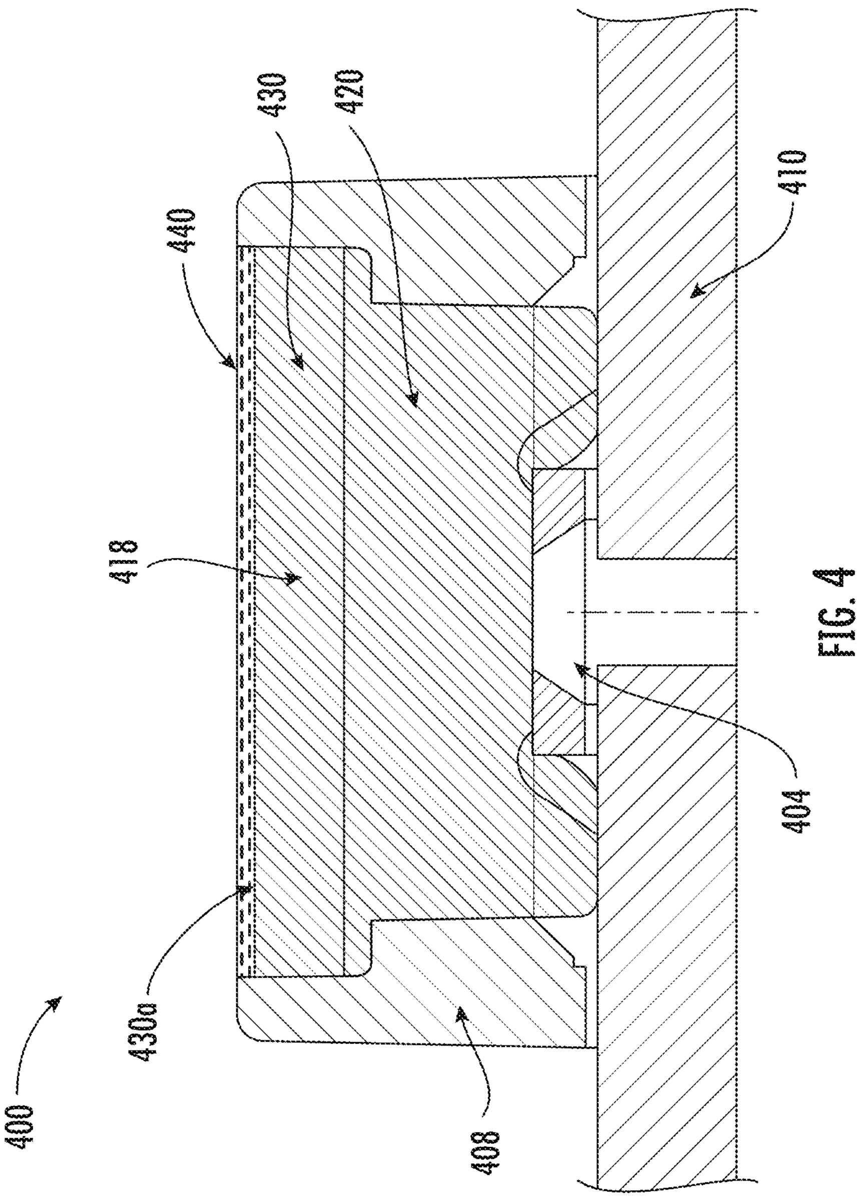
FIG. 4 illustrates a cross-section of an example protective coating protecting the fluid coupling medium in accordance with an example embodiment of the present disclosure.

Referring now to FIG. 4, an example media-isolated pressure sensor 400 is provided. As depicted in FIG. 4, the example media-isolated pressure sensor 400 includes a fluid coupling medium 402 comprising a first portion of a fluid coupling substance 420 and a second portion of a fluid coupling substance 430. The fluid coupling medium 402 is deposited within the interior cavity 418 of the media-isolated pressure sensor 400 formed by a substrate 410 and one or more walls comprising a pressure sensor housing 408 extending from the substrate 410. As further depicted in FIG. 4, a protective coating 440 is deposited on a top surface 430*a* of the fluid coupling medium 402.

As depicted in FIG. 4, a protective coating 440 is deposited on the top surface 430*a* of the second portion of the fluid coupling substance 430. In some embodiments, the fluid coupling medium of the media-isolated pressure sensor 400 is exposed to abrasive fluid media and/or high pressure environments. The fluid media in such environments may bombard the fluid coupling substance comprising the fluid coupling medium 402. The fluid coupling medium 402 may become damage or corroded under such conditions. A damaged or corroded fluid coupling medium 402 may adversely affect the performance of the media-isolated pressure sensor 400.

A protective coating 440, may be any substance disposed between the fluid coupling medium 402 and the fluid media exerting pressure on the media-isolated pressure sensor 400, configured to protect the fluid coupling medium 402 while still allowing the transmission of the pressure through the fluid coupling medium 402 to the pressure sensing circuitry 404. In some embodiments, the protective coating 440 may comprise an epoxy. An epoxy protective coating 440 may provide a hard layer as compared to the fluid coupling medium 402 while the fluid coupling medium 402 remains comparatively soft. Thus, the harder protective coating 440 provides protection against a harsh environment and fluid media while the still providing the required fluid transfer medium from the fluid media to the pressure sensing circuitry 404.

Figure 5:
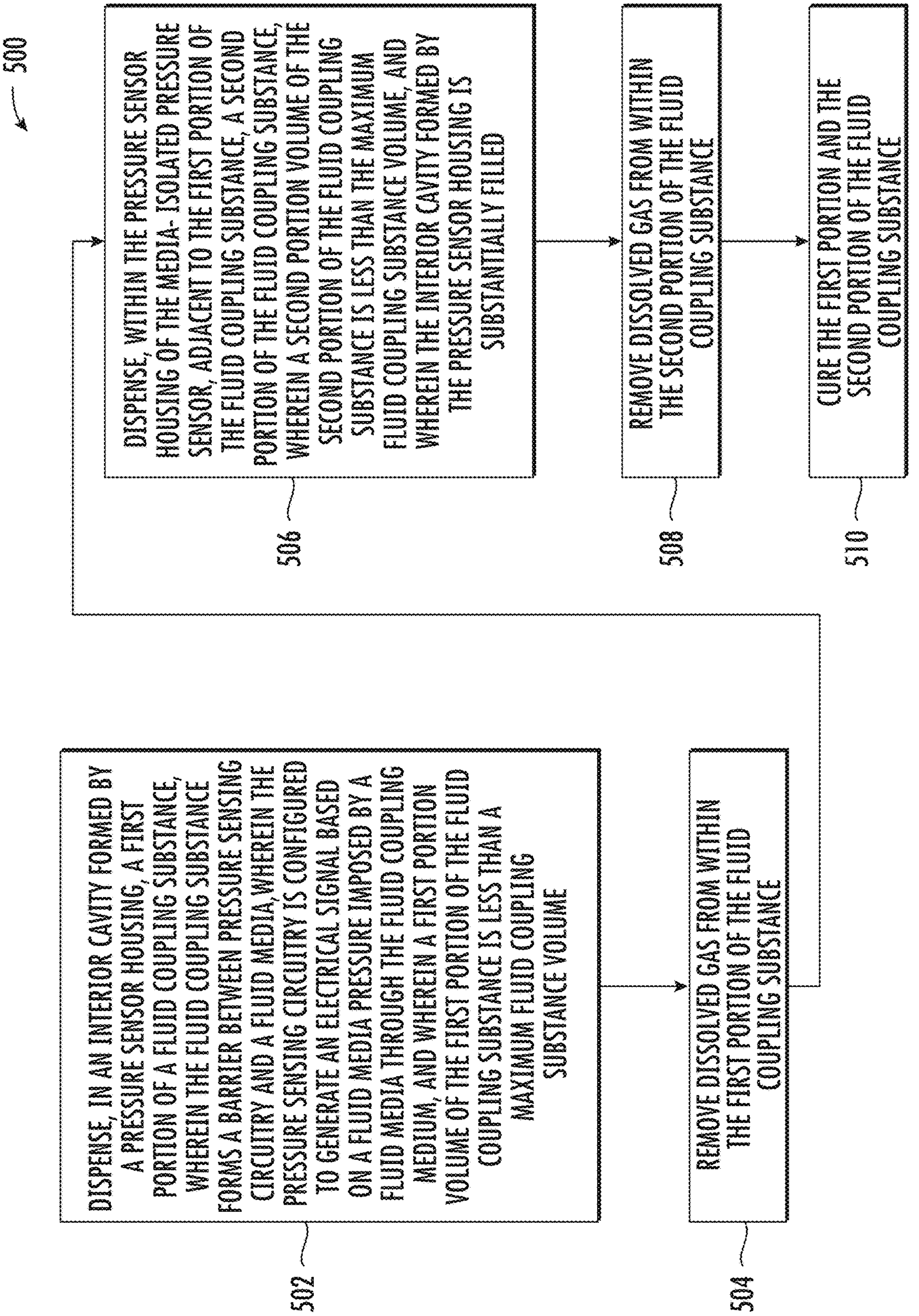
FIG. 5 illustrates an example process for manufacturing a fluid coupling medium in a media-isolated pressure sensor in accordance with an example embodiment of the present disclosure.

Referring now to FIG. 5, an example process 500 for manufacturing a fluid coupling medium (e.g., fluid coupling medium 102, 302, 402) is provided. At block 502, a first portion of a fluid coupling substance (e.g., fluid coupling substance 220, 320, 420) is dispensed in an interior cavity (e.g., interior cavity 118, 218, 318, 418) formed by a pressure sensor housing (e.g., pressure sensor housing 108, 208, 308, 408), wherein the fluid coupling substance forms a barrier between pressure sensing circuitry (e.g., pressure sensing circuitry 104, 204, 304, 404) and a fluid media (e.g., fluid media 114), wherein the pressure sensing circuitry is configured to generate an electrical signal based on a fluid media pressure imposed by a fluid media through the fluid coupling medium, and wherein a first portion volume of the first portion of the fluid coupling substance is less than a maximum fluid coupling substance volume. As described herein, a maximum fluid coupling substance volume may be determined based on the fluid coupling substance utilized to create the fluid coupling medium, the dimensions of the interior cavity, the vacuuming techniques utilized, the curing procedures utilized, and other similar factors. In some embodiments, the volume of fluid coupling substance necessary to fill the interior cavity of the media-isolated pressure sensor may exceed the maximum fluid coupling substance volume. In such an instance, the amount of fluid coupling substance disposed in the interior cavity of the media-isolated pressure sensor is less than the maximum fluid coupling substance volume.

In some embodiments, the maximum fluid coupling substance volume may be based on a cavity ratio, determined based on the ratio of the cavity height (or the height of the fluid coupling substance within the cavity) to the cavity diameter. In such an instance, a maximum height may be determined based on the cavity diameter. For example, if the maximum fluid coupling substance volume is 0.4 and the cavity diameter is 10 millimeters, the height of the fluid coupling substance may not exceed 4 millimeters. Thus, the maximum height of the fluid coupling substance in the interior cavity is 4 millimeters. In such an instance, the height of the first portion of the fluid coupling substance is not to exceed 4 millimeters.

At block 504, dissolved gas (e.g., dissolved gas 116) is removed from within the first portion of the fluid coupling substance. Dissolved gas may be removed by any method designed to eject entrapped gases from within the fluid coupling substance. For example, the media-isolated pressure sensor containing the partially-filled interior cavity may be exposed to a vacuum environment. The vacuum environment may force out any dissolved gas within the fluid coupling substance. In some embodiments, the vacuum degassing process may utilize a vacuum environment at or below a pressure of 0.04 millibars, with the media-isolated pressure sensor exposed to the vacuum environment for at or around 15 minutes.

In some embodiments, the first portion of the fluid coupling substance may be cured after the dissolved gas is evacuated from the first portion of the fluid coupling substance and before additional portions of the fluid coupling substances are added to the interior cavity.

At block 506, a second portion of the fluid coupling substance (e.g., fluid coupling substance 330, 430) is dispensed within the pressure sensor housing of the media-isolated pressure sensor, adjacent to the first portion of the fluid coupling substance, wherein a second portion volume of the second portion of the fluid coupling substance is less than the maximum fluid coupling substance volume, and wherein the interior cavity formed by the pressure sensor housing is substantially filled. As described herein, the second portion of the fluid coupling substance is deposited in the interior cavity on the top surface of the first portion of the fluid coupling substance. Depositing the second portion of the fluid coupling substance is still subject to a limit established by the maximum fluid coupling substance volume. In an instance in which the interior cavity of the media-isolated pressure sensor may be substantially filled without exceeding the maximum fluid coupling substance volume, sufficient fluid coupling substance is added to substantially fill the interior cavity. In an instance in which the required volume of fluid coupling substance required to substantially fill the interior cavity exceeds the maximum fluid coupling substance volume, additional portions of fluid coupling substance may be added, subsequent to disposing the second portion of fluid coupling substance into the interior cavity and removal of dissolved gas from the second portion of the fluid coupling substance.

In some embodiments, the maximum fluid coupling substance volume may be based on a cavity ratio, determined based on the ratio of the cavity height (or the remaining cavity height in the interior cavity) to the cavity diameter. If the remaining cavity height in the interior cavity exceeds the maximum height determined based on the maximum cavity ratio, additional portions of fluid coupling substance may be required to fill the interior cavity.

At block 508, the dissolved gas is removed from within the second portion of the fluid coupling substance. Dissolved gas in the second portion of the fluid coupling substance may be removed by any method designed to eject entrapped gases from within the fluid coupling substance. For example, the media-isolated pressure sensor containing the partially-filled interior cavity may be exposed to a vacuum environment. The vacuum environment may force out any dissolved gas within the fluid coupling substance. In some embodiments, the vacuum degassing process may utilize a vacuum environment at or below a pressure of 0.04 millibars, with the media-isolated pressure sensor exposed to the vacuum environment for at or around 15 minutes.

At block 510, the first portion and the second portion of the fluid coupling substance are cured. A fluid coupling substance may be cured to be fully solidified and properly function as a coupling mechanism in a media-isolated pressure sensor. For example, in an instance in which silicone gel is used as a fluid coupling substance, the silicone gel may be cured by resting at room temperature for a specified amount of time, and/or by exposing the silicone gel to heat. All portions of the fluid coupling substance may be cured simultaneously, or, in some embodiments, each portion of the fluid coupling substance may be cured individually.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. The disclosed embodiments relate primarily to a media-isolated pressure sensor, however, one skilled in the art may recognize that such principles may be applied to any application in which a fluid coupling substance such as silicone gel is used as a fluid coupling medium. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as “comprises,” “includes,” and “having” should be understood to provide support for narrower terms such as “consisting of,” “consisting essentially of,” and “comprised substantially of” Use of the terms “optionally,” “may,” “might,” “possibly,” and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. A coupling mechanism for a media-isolated pressure sensor, the coupling mechanism comprising:

a fluid coupling medium disposed in an interior cavity of a pressure sensor housing, forming a barrier between pressure sensing circuitry and a fluid media, wherein the pressure sensing circuitry is configured to generate an electrical signal based on a fluid media pressure imposed by the fluid media through the coupling mechanism, and wherein disposing the fluid coupling medium in the interior cavity of the pressure sensor housing comprises:

dispensing, within the interior cavity, a first portion of a fluid coupling substance, wherein a first portion volume of the first portion of the fluid coupling substance is less than a maximum fluid coupling substance volume;

removing dissolved gas from within the first portion of the fluid coupling substance;

dispensing, within the interior cavity, adjacent to the first portion of the fluid coupling substance, a second portion of the fluid coupling substance, wherein a second portion volume of the second portion of the fluid coupling substance is less than the maximum fluid coupling substance volume, and wherein the interior cavity formed by the pressure sensor housing is substantially filled;

removing dissolved gas from within the second portion of the fluid coupling substance; and curing the first portion and the second portion of the fluid coupling substance.

2. The coupling mechanism of claim 1, further comprising a protective coating disposed on a top surface of the fluid coupling medium, wherein the protective coating forms a second barrier between the fluid coupling medium and the fluid media.

3. The coupling mechanism of claim 2, wherein the protective coating comprises an epoxy.

4. The coupling mechanism of claim 1, wherein removing dissolved gas from the fluid coupling substance comprises exposing the fluid coupling substance to a vacuum environment.

5. The coupling mechanism of claim 1, wherein curing the first portion of the fluid coupling substance occurs before the second portion of the fluid coupling substance is dispensed within the interior cavity.

6. The coupling mechanism of claim 1, wherein the maximum fluid coupling substance volume is determined based on a cavity ratio of a cavity diameter of the interior cavity and a cavity height of the interior cavity.

7. The coupling mechanism of claim 6, wherein a maximum cavity ratio defining the maximum fluid coupling substance volume is between 0.39 and 0.41.

8. A method for manufacturing a coupling mechanism in a media-isolated pressure sensor, the method comprising:

dispensing, in an interior cavity formed by a pressure sensor housing, a first portion of a fluid coupling substance, wherein the fluid coupling substance forms a barrier between pressure sensing circuitry and a fluid media, and wherein a first portion volume of the first portion of the fluid coupling substance is less than a maximum fluid coupling substance volume;

removing dissolved gas from within the first portion of the fluid coupling substance;

dispensing, within the pressure sensor housing of the media-isolated pressure sensor, adjacent to the first portion of the fluid coupling substance, a second portion of the fluid coupling substance, wherein a second portion volume of the second portion of the fluid coupling substance is less than the maximum fluid coupling substance volume, and wherein the interior cavity formed by the pressure sensor housing is substantially filled;

removing dissolved gas from within the second portion of the fluid coupling substance; and curing the first portion and the second portion of the fluid coupling substance, wherein the pressure sensing circuitry is configured to generate an electrical signal based on a fluid media pressure imposed by the fluid media through the coupling mechanism.

9. The method of claim 8, further comprising: disposing a protective coating on a top surface of the fluid coupling substance, wherein the protective coating forms a second barrier between the fluid coupling substance and the fluid media.

10. The method of claim 9, wherein the protective coating comprises an epoxy.

11. The method of claim 8, wherein in an instance in which the second portion of the fluid coupling substance does not substantially fill the interior cavity formed by the pressure sensor housing, the method further comprises:

dispensing in the interior cavity of the pressure sensor housing, one or more additional portions of the fluid coupling substance, wherein each of the one or more additional portions of the fluid coupling substance have an additional portion volume less than the maximum fluid coupling substance volume; and removing dissolved gas from within each of the one or more additional portions of the fluid coupling substance, wherein dispensing additional portions of the fluid coupling substance and removing dissolved gas are repeated until the interior cavity is substantially full.

12. The method of claim 8, wherein removing dissolved gas from the fluid coupling substance comprises exposing the fluid coupling substance to a vacuum environment.

13. The method of claim 8, wherein curing a portion of the fluid coupling substance occurs before a subsequent portion of the fluid coupling substance is dispensed within the interior cavity.

14. The method of claim 8, wherein the maximum fluid coupling substance volume is determined based on a cavity ratio of a cavity diameter of the interior cavity and a cavity height of the interior cavity.

15. The method of claim 14, wherein a maximum cavity ratio defining the maximum fluid coupling substance volume is between 0.39 and 0.41.

16. A media-isolated pressure sensor comprising: a pressure sensor housing configured to form an interior cavity; pressure sensing circuitry disposed within the interior cavity of the pressure sensor housing; and a fluid coupling mechanism comprising a fluid coupling medium disposed in the interior cavity of the pressure sensor housing, wherein disposing the fluid coupling medium in the interior cavity of the pressure sensor housing comprises: dispensing, within the interior cavity, a first portion of a fluid coupling substance, wherein a first portion volume of the first portion of the fluid coupling substance is less than a maximum fluid coupling substance volume; removing dissolved gas from within the first portion of the fluid coupling substance; dispensing, within the interior cavity, adjacent to the first portion of the fluid coupling substance, a second portion of the fluid coupling substance, wherein a second portion volume of the second portion of the fluid coupling substance is less than the maximum fluid coupling substance volume, and wherein the interior cavity formed by the pressure sensor housing is substantially filled; removing dissolved gas from within the second portion of the fluid coupling substance; and curing the first portion and the second portion of the fluid coupling substance, wherein the fluid coupling medium forms a barrier between the pressure sensing circuitry and a fluid media, and wherein the pressure sensing circuitry is configured to generate an electrical signal based on a fluid media pressure imposed on the pressure sensing circuitry through the fluid coupling mechanism.

17. The media-isolated pressure sensor of claim 16, further comprising a protective coating disposed on a top surface of the fluid coupling medium, wherein the protective coating forms a second barrier between the fluid coupling medium and the fluid media.

18. The media-isolated pressure sensor of claim 17, wherein the protective coating comprises an epoxy.

19. The media-isolated pressure sensor of claim 16, wherein removing dissolved gas from the fluid coupling substance comprises exposing the fluid coupling substance to a vacuum environment.

20. The media-isolated pressure sensor of claim 16, wherein curing the first portion of the fluid coupling substance occurs before the second portion of the fluid coupling substance is dispensed within the interior cavity.

* * * * *